(12) United States Patent
Scott et al.

(10) Patent No.: US 6,449,354 B1
(45) Date of Patent: Sep. 10, 2002

(54) COMMUNICATION SYSTEM, ARTICLE AND METHOD OF CONFIGURING AND ESTABLISHING A CONNECTION THEREIN

(75) Inventors: Barry Scott, Tilehurst; Stuart S Bailey, Maidenhead, both of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/327,561

(22) Filed: Jun. 8, 1999

(51) Int. Cl.[7] .............................................. H04M 7/00
(52) U.S. Cl. ............. 379/221.01; 379/219; 379/114.02; 370/238; 370/904
(58) Field of Search ........................... 379/219, 221.01, 379/221.14, 229, 114.02, 114.07; 370/237, 238, 253, 902, 904

(56) References Cited

U.S. PATENT DOCUMENTS

| | | | | |
|---|---|---|---|---|
| 6,330,321 B2 | * | 12/2001 | Detampel, Jr. et al. | 379/205.01 |
| 6,343,073 B1 | * | 1/2002 | Mashinsky | 379/220 |
| 6,345,090 B1 | * | 2/2002 | Walker et al. | 379/114.12 |
| 6,353,596 B1 | * | 3/2002 | Grossglausser et al. | 370/256 |
| 6,359,979 B1 | * | 3/2002 | Wang et al. | 379/221.01 |
| 6,363,411 B1 | * | 3/2002 | Dugan et al. | 379/201 |

* cited by examiner

Primary Examiner—Craigton Smith
(74) Attorney, Agent, or Firm—Lee, Mann, Smith, McWilliams, Sweeney & Ohlson (57) ABSTRACT

To avoid searching for objects that are not effectively configured and therefore to mitigate connectivity and system failure, an intermediate routing object index (100, 103) is created to each and every object in a system (36). In a telecommunications system, for example, an object is only operational at a node (10, 30–34), such as a switch, upon receipt of all necessary configuration messages (102) from an overall system controller (12) responsible for overseeing operation of the node (10, 30–34) and the set-up of a connection. The routing object index stores (103, 108) an indication of the receipt of the necessary configuration messages and so provides a direct indication of whether the object exists and whether it is effectively configured. Consequently, during a connection establishment process in which control information, such as dialled digits (42, 150), indicates a called party (50) and more especially its serving node (34), the system of the present invention initially creates (100) and then subsequently accesses (156) the routing object index before attempting to locate the associated object (164). Should the routing object index fail to provide verification (106, 172) of a fully configured object or if the routing object does not exist (170), the routing object index causes the system to indicate (174) that a connection is not presently possible. The routing object index can also provide a mechanism for tracking (114–118) system configuration at a node level.

23 Claims, 4 Drawing Sheets

| Destination | Route Set (Link Set – cost) | Link Set (Link #) |
|---|---|---|
| Glasgow | LS1 – 40 | L1 |
|  | LS2 – 20 | L2 – L3 |
|  | LS3 – 10 | L4 – L7 |
| New York | LS1 – 20 | L1 |
|  | LS2 – 50 | L2 – L3 |
|  | LS3 – 30 | L4 – L7 |
| Amsterdam | etc | etc |

COMMUNICATION SYSTEM, ARTICLE AND METHOD OF CONFIGURING AND ESTABLISHING A CONNECTION THEREIN

BACKGROUND TO THE INVENTION

This invention relates, in general, to a method of configuring a system and a method of establishing a connection in such a system. More particularly, but not exclusively, the present invention relates to a communication system that utilises object-orientated code to construct a routing matrix used to establish a connection in a telephony system, such as a mixed broadband-narrowband network.

SUMMARY OF THE PRIOR ART

Telecommunication networks comprise nodes interconnected by communication resources (usually termed "links"), with a particular network technology characterised by the means of transmission of user and control information along these links and also by the routing and relaying functions embodied in the nodes. A connection from a calling party to a called party is actually achieved through an appropriate selection of a communication path, which path is determined on the basis of several decisions made by routing logic contained within switch fabrics of a network (or interconnected system of networks).

A typical switch fabric logically contains a controller (sometimes referred to as computing module or call server) that interfaces directly with a master database of network management information generally pertaining to network topology (and more especially control information). The controller is further responsible for overseeing specific call connections (e.g. trunk to trunk connections) that are managed by lower level intelligent trunking peripherals. Each lower level intelligent device functions to provide a termination for trunks (or equivalent forms of channel resource) and includes a routing function, typically in the form of an algorithm. In other words, the controller manages intelligent peripherals within the switch fabric and invokes feature codes and oversees the set-up of circuit-to-circuit (in a narrowband sense) and circuit-to-virtual path connections across a broadband interface, whereas the router function identifies a path down which control information from the controller is sent to an addressed unit. This form of distributed architecture is preferred by virtual of its flexibility, increased handling capacity over a stand-alone routing unit and its ease of upgrade, although the controller does have a limited processing capability and can only support a limited number of peripheral entities and connections.

Routing information from the controller is down-loaded to the intelligent peripherals, with the download occurring in chunks of data that are assembled at the intelligent peripheral to form a complete understanding of its available connection topology. Download can occur in response to network adaptation, such as the addition of new hardware or connection paths, but in any event is generally triggered at installation. More particularly, information download to the intelligent peripherals is presently accomplished in a multi-stage, piecewise process in which each class is assembled from the separate receipt of configuration information and availability information pertaining to confirmation of the actual physical existence of the class. In other words, in order to construct a valid object, the intelligent peripheral must receive a full complement of configuration messages; these being sent over a period of time in at least two separate bits from the controller. The configuration messages can arrive in any order.

By way of further clarification, it will be appreciated that a specific route set, a specific link set and a specific link are, in fact, all objects and that an object is therefore a combination of a set of data and a set of behaviour. Moreover, "behaviour" explains the interaction of data and thus allows the setting up of relationships through the issuance, for example, of commands or questions. Any response is therefore specific to a particular activity involved in setting up a call. Finally, to expound the relation between objects and class, it will be understood that shared behaviour between objects in endemic of the same class of objects. Each object is uniquely identifiable.

In the context of this description, it will be understood that the switch fabric is an integral part of the control network associated with each trunk, and so the term trunk implies the co-existence of an associated signalling link.

The term routing is used to describe the process of determining the path the information will take through the network, while relaying is the process of transferring information from one link to another, i.e. the information is merely passed, without alteration, from one channel resource to another.

As regards connection paths within a network, nodes (i.e. switch fabrics) are generally interconnected either by a direct communication resource or via at least one other node. Putting this another way, a trunk that is incident to a first node will be connected by the intelligent peripheral in the first node to one of a number of possible links that is believed to connect to an exit node associated with the called party. From an information perspective, each node (and particularly each intelligent peripheral by virtue of down-load from the switch fabric controller) is aware of certain classes of information, namely: i) route sets associated with destination nodes (e.g. switch fabrics respectively associated with Glasgow, New York and Amsterdam); ii) link sets identifying possible connection paths to the destination node; and iii) links that are connection specific. A link set will usually contain many links, whereas a route set will contain at least one link set identity together with an associated "cost" (or weighting factor) indicating a ranking preference for selection of a particular link set. As regards the "cost", a direct point-to-point connection from an incident switch fabric to a destination switch fabric is likely to have a preferable cost as opposed to an indirect route via an intermediate switch fabric.

From an actual connection perspective, the intelligent peripheral reacts to an incoming call establishment request by finding the route set object of the destination address (which is typically derived by the dialled digits entered by the calling party). The intelligent peripheral then looks in the route set object for link sets before identifying the link set (usually) having the cheapest cost. The intelligent peripheral checks for the availability of the selected link set and then finally chooses a specific link therefrom. Information can then be sent. Basically, the various layers of selection provide robustness in routing; the process is generally known as message transfer part (MTP) routing and is part of the Common Channel Signalling No. 7 (CCS-7) protocol.

In relation to an exemplary narrowband digital network, user and control information (generally termed "data") may be interleaved, using time division multiplexing (TDM), on a pulse code modulated (PCM) bearer channel. Data is then relayed across a node by some form of synchronous TDM switching fabric, often of the 'time-space-time' type. Control information (e.g. call set up and tear down messages) logically follows the same path (although not always the same physical path) through the network as user information, and is terminated in each node for routing purposes. Routing is conventionally performed, in each node, on a 'hop-by-hop' basis using long lived routing tables, i.e. the node is sufficiently intelligent to determine an optimum route for the succeeding network connection.

Control information is regulated by a signalling scheme that is distinctive to the type of network employed. Particularly, public signalling systems are used between nodes of a public network and between public networks of different operators. Signalling System No. 7 is the only important example of a public signalling system. Access signalling systems are used between subscribers and edge nodes of public networks, e.g. between a radiotelephone and a base station subsystem (BSS). In fact, the most common digital access signalling schemes are Common Channel Signalling Systems, such as the Integrated Service Digital Network (ISDN) DSS1 signalling schemes (and its predecessors) and Channel Associated Signalling schemes that are both derived from analog signalling. Private schemes are generally derived from access schemes but provide richer functionality within personal networks, such as within a secure private branch exchange (PBX).

Broadband digital networks are characterised in that user and control information is transmitted in fixed or variable length 'packets', with these packets prepended with headers that contain bearer channel identification. In contrast with narrowband systems, user information is relayed across a node via an asynchronous switching fabric that examines each packet in turn (using some kind of fairness algorithm) and directs it to the appropriate output link in response to the input link and bearer channel identification. Routing and control information transmission is, however, similar to that for the narrowband case, and differs only inasmuch as the signalling schemes are technology specific.

Narrowband telecommunication architectures, such as the DMS™ exchange manufactured by Northern Telecom Limited, provide a foundation for mixed and, ultimately, solely broadband-based systems. In fact, the DMS™ exchange already provides a full set of call processing and routing features by virtue of its development over many years, with the DMS™ exchange supported by many millions of lines of program code.

Present systems are, however, deficient in their operation since they work on an assumption that each object is always available once at least one portion of the related information is downloaded to the intelligent peripheral from the controller. More specifically, the intelligent peripheral is configured to assume that it will always receive the full complement of information necessary for construction of a valid object after it has previously been sent a first (relevant) information portion. Consequently, although a valid object may not therefore exist, the routing mechanism can get tied-up in an endless search loop whereby system operation is compromised. Moreover, since the intelligent peripheral effectively has direct access to configuration data, the routing algorithm may make decisions based on a partially configured object that results in messages being lost or sent to a wrong destination.

Unfortunately, present systems are also sensitive to the order in which configuration messages are received by the intelligent peripheral. In fact, configuration messages must be received in a pre-set order otherwise messages can be lost or the system can be mis-configured, with the later mis-configuration usually undetectable.

Previous solutions to the problem outlined above involve the pre-allocation of a fixed number of objects at the intelligent peripheral. Unfortunately, pre-allocation requires the use of all available memory regardless of the complexity of the network configuration. Consequently, additional memory and processing capacity must be provided to the intelligent peripheral if a system up-grade is required by a network operator; this is usually expensive and inevitably leads to some down-time for reconfiguration.

SUMMARY OF THE INVENTION

According to a first aspect of the present invention there is provided a method of configuring a communication system comprising a call server responsible for overseeing connection of a call and a node providing a connection interface to a calling party making the call and wherein the node is logically responsive to the call server and the connection is established through the use of at least one object, the method comprising: receiving a first configuration message associated with an object, the first configuration message sent by the call server and containing information pertinent to the effective establishment of the object at the node; establishing a routing object index associated with the object in response to the first configuration message and storing the information contained in the first configuration message as a partial object; receiving at least a second configuration message associated with the object, said at least a second configuration message sent by the call server and containing additional information pertinent to the effective establishment of the object at the node; recording receipt of said at least a Second configuration message and storing the additional information contained in said at least a second configuration message with the partial object, thereby to complete the object; and providing access to the object at the node through a verification process involving the routing object index.

In a preferred embodiment, providing access to the object further includes: establishing whether the routing object exists; and establishing whether the routing object is deemed fully configured.

Preferably, the routing object has a plurality of configuration fields each being deemed complete upon respective receipt of said first configuration message and said at least a second configuration message.

Typically, the routing object index shares a common name with the object with the name derived from the first configuration message.

A method of a preferred embodiment includes sending a further configuration message from the call server, the further configuration message containing information pertinent to the object and arranged to affect operation of the object.

In another embodiment, the method of configuring a communication system comprises: retrieving the object when the routing object is fully configured; selecting, as necessary, a related object from the object; and searching for a second routing object index associated with the related object, which second routing object index is located within the object.

Establishing whether the second routing object exists and whether the second routing object is deemed fully configured is a layered process inasmuch as a connection may require the use of many objects and each object will therefore have a dedicated routing object index.

Since a routing object contains a plurality of configuration fields, a preferred method of configuring a communication system comprises initiating a tracking request in which a status of the plurality of configuration fields of a routing object is interrogated and commented on.

A connection is only established when the verification process indicates that the routing object index and is deemed fully configured.

In another aspect of the present invention there is provided a method of establishing a communication link between a calling party and a called party addressed by the calling party in a communication system containing a plurality of routing nodes operationally responsive to a call server, the method comprising: having the calling party enter an address of the called party into a first routing node, the address containing an indication of a destination routing node associated with the called party and wherein the destination routing node is accessed via a communication path determined by a plurality of objects; providing access to selected ones of the plurality of objects at the node through a verification process involving a dedicated routing object index associated with each object.

In a preferred method, providing access to the object further includes: establishing whether the routing object exists; and establishing whether the routing object is deemed fully configured.

The routing object is established by a plurality of temporally displaced configuration messages communicated to selected nodes by the call server, wherein: the routing object is created following receipt of a first configuration message associated with an object, the first configuration message containing information pertinent to the effective establishment of the object at the node; a partial object is created from the first configuration message; and the routing object is deemed to be complete upon subsequent receipt at the node of at least a second configuration message associated with the object, said at least a second configuration message sent by the call server and containing additional information pertinent to the effective operational establishment of the object at the node, when combined with the first configuration message stored previously as the partial object.

The method further includes recording receipt of said configuration messages in the routing object and storing information contained in said configuration messages as the object. Preferably, the routing object has a plurality of configuration fields each being deemed complete upon respective receipt of said configuration messages.

In another aspect of the present invention there is provided a communication system comprising a call server responsible for overseeing connection of a call and a plurality of nodes providing a connection interfaces between a calling party and an addressed party, wherein the plurality of nodes are logically responsive to the call server and the connection is established through the use of at least one object within a node, each node comprising: a memory having dedicated routing object indexes associated with objects, each routing object index created by the node in response to configuration messages sent by the call server and associated with a specific object, and a keyed index of objects accessible via specifically associated routing object indexes; and a processor arranged, in use, to administer receipt and storage of the configuration messages as objects and the creation of the dedicated routing object indexes, the processor further operationally responsive to an address of the addressed party whereby the processor is arranged to provide access to a selected object at the node only through a configuration verification process involving the routing object index.

In a further aspect of the present invention there is provided an intelligent trunking peripheral for routing calls in a communication system, the intelligent trunking peripheral comprising: a memory having dedicated routing object indexes each associated with objects, each routing object index created by the switch in response to configuration messages sent by the call server and associated with a specific object, and a keyed index of objects accessible via specifically associated routing object indexes; and a processor arranged, in use, to administer receipt and storage of the configuration messages as objects and the establishment of the dedicated routing object indexes, the processor further operationally responsive to an address whereby the processor is arranged to provide access, at the switch, to a selected object required to establish a communication path to the address only through a configuration verification process involving the routing object index.

In still yet another aspect of the present invention there is provided a computer program product for a computerised intelligent trunking peripheral including a processor for selecting a communications path to an addressed party, the computer program product comprising: code that directs the processor to create dedicated routing object indexes each associated with objects each configured at the computerised intelligent trunking peripheral by a plurality of configuration messages code that directs the processor to store a keyed index of objects derived from information contained in the plurality of configuration messages; code providing access to a selected one of the keyed index of objects via an operationally configured routing object index; and code rejecting the set-up of communications paths to an addressed party in the event that a routing object is deemed not to be fully configured by virtue of the processor not having received all necessary configuration messages required for configuration of an associated object.

Generally, the code resides in a computer readable memory.

In a further aspect of the present invention there is provided a computer program product directly loadable into the internal memory of a computer, comprising software code portions for performing the steps of: receiving a first configuration message associated with an object, the first configuration message sent by a call server and containing information pertinent to the effective establishment of the object at a routing node of a telecommunications network; establishing a routing object index associated with the object in response to the configuration message and storing the information contained in the first configuration message as a partial object; receiving at least a second configuration message associated with the object, said at least a second configuration message sent by the call server and containing additional information pertinent to the effective establishment of the object at the node; recording receipt of said at least a second configuration message and storing the additional information contained in said at least a second configuration message with the partial object, thereby to complete the object; and providing access to the object at the node through a verification process involving the routing object index; wherein said product is run on a computer.

Advantageously, the present invention therefore provides an improved interconnection mechanism that is more reliable than that hitherto proposed or implemented by prior art systems and techniques. More specifically, the present invention can create a network of interconnected objects used to route control messages in a telecommunications switch system, with it being irrelevant as to the order of receipt of information used to create such objects. In other words, the information used to create objects can arrive piece-by-piece over a period in separate configuration messages having no structured order of arrival. Beneficially, the system can be asked to route control messages, such as CCS7, before a complete set of objects for a connection has been created, although objects that have not be fully configured are not used.

A significant benefit arises from the flexibility of the system in relation to set-up and configuration, which benefit is associated with the ability of being frugal in terms of memory and processing utilisation. Specifically, the system of the preferred embodiment has no pre-set limit on the number of objects that it can access and create and so minimal storage capacity is used for storing network topology information. Consequently, spare memory and processing capabilities of a node, such as by an intelligent trunking peripheral within a switch, can be utilised for additional management tasks and functions, and indeed can support the future expansion of the system in terms of network size and complexity (e.g. additional features) and functionality upgrades. In fact, the memory usage of the system is therefore proportional to the complexity of the network configuration requested by the network operator.

Use of the routing object index is also beneficial in relation to algorithm and system development, since the establishment of the routing object index in an appropriate memory slot indicates that the software is, ostensibly, operational; this provides a saving in engineering design, implementation and testing time.

Advantageously, the present invention can be deployed within existing systems without disrupting present operation, with the only requirement being that the node have sufficient processing and memory capacity.

BRIEF DESCRIPTION OF THE DRAWINGS

Exemplary embodiments of the present invention will now be described with reference to the accompanying drawings in which.

DETAILED DESCRIPTION OF A PREFERRED EMBODIMENT

Figure 1:
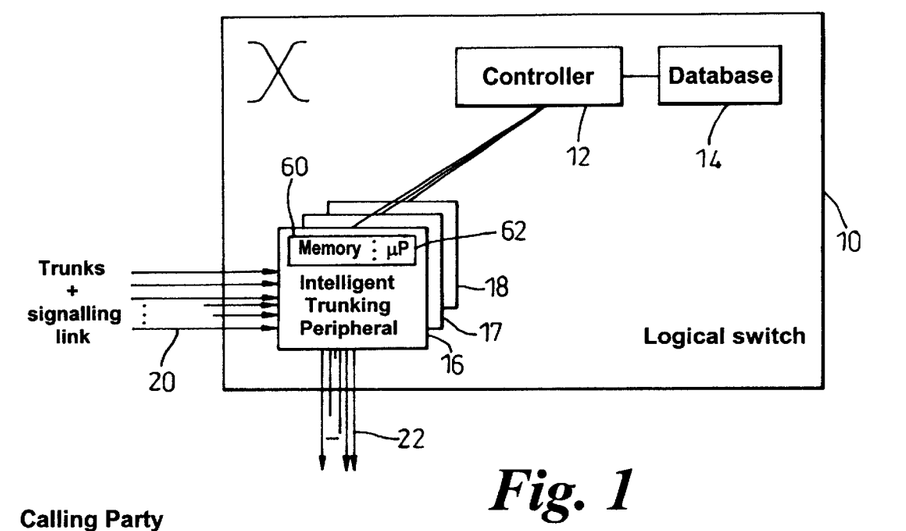
FIG. 1 is a block diagram of logical switching and routing node in a communication system, which node may be adapted to support the present invention.
Figure 2:
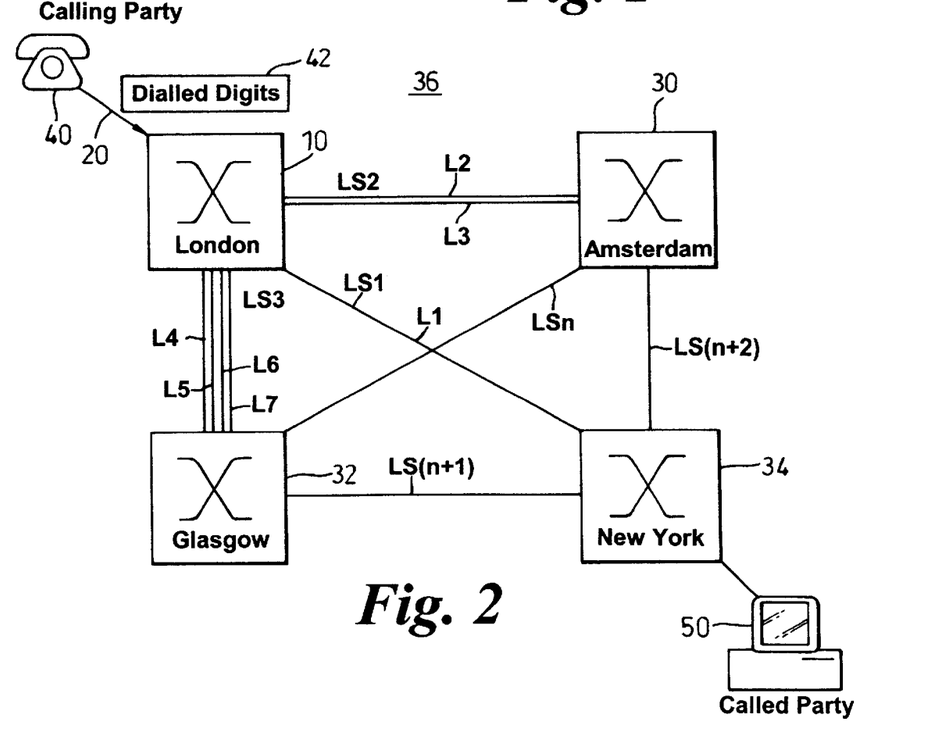
FIG. 2 is a block diagram of a typical communication network incorporating the logical switching and routing node of FIG. 1.
Figure 3:
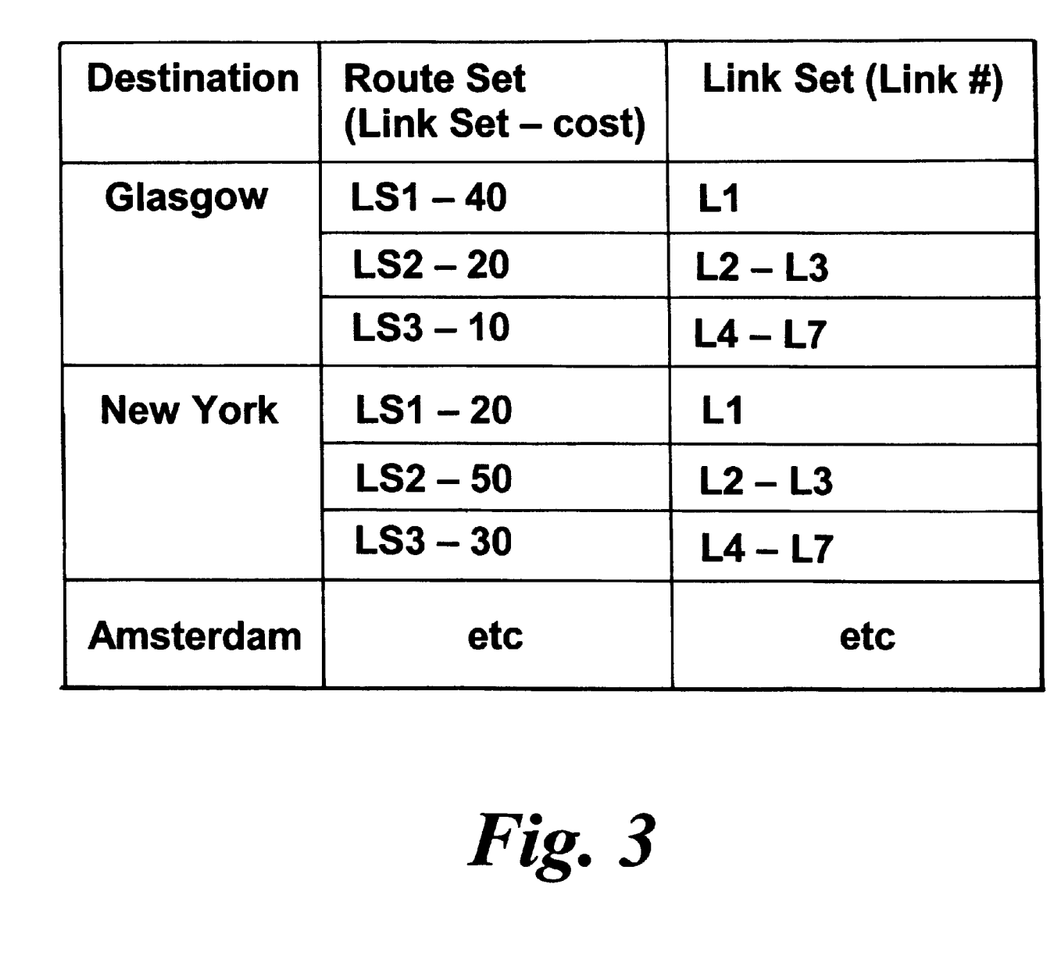
FIG. 3 is a table exemplifying a route selection database containing objects and classes of objects.

Turning briefly to FIGS. 1 to 3, a typical network architecture and connection topology is shown, which architecture and topology can capable of supporting the concepts of the present invention. Basically, a node (e.g. a logical switch) 10 is shown to contain a controller 12 and associated database 14. The controller is coupled to a plurality of intelligent trunking peripherals 16–18 which themselves terminate incident trunks 20. Communication links 22 provide for interconnection of the node 10 to other nodes 30–34 within the network 36.

The function of equipment within the system and the inter-operation and set up of a call has already been described in considerable detail above, and so for the sake of brevity more elaborate description at this point is superfluous. It is suffice to say that FIG. 2 shows a calling party 40 that has accessed an intelligent trunking peripheral 16 via dialled digits 42 sent over a communication resource, e.g. one of the plurality of incident trunks 20. The node 10, which could be an exchange, is interconnected to other remote nodes 30–34 (that also provide routing functions) through dedicated link sets (LS) containing at least one (and usually tens of) signalling links (L). In other words, the intelligent trunking peripherals communiate with each other through signalling links that control the end-to-end bearer connections. In response to the dialled digits 42 (addressing a called party 50, such as an Internet server or a computer), an intelligent trunking peripheral in the node identifies a destination exchange and locates an associated route set (such as shown in FIG. 3). Eventually, a link of a selected and available link set can be selected, e.g. for a called party located in New York, link L1 is selected from link set LS1 having a cost of twenty.

Figure 4:
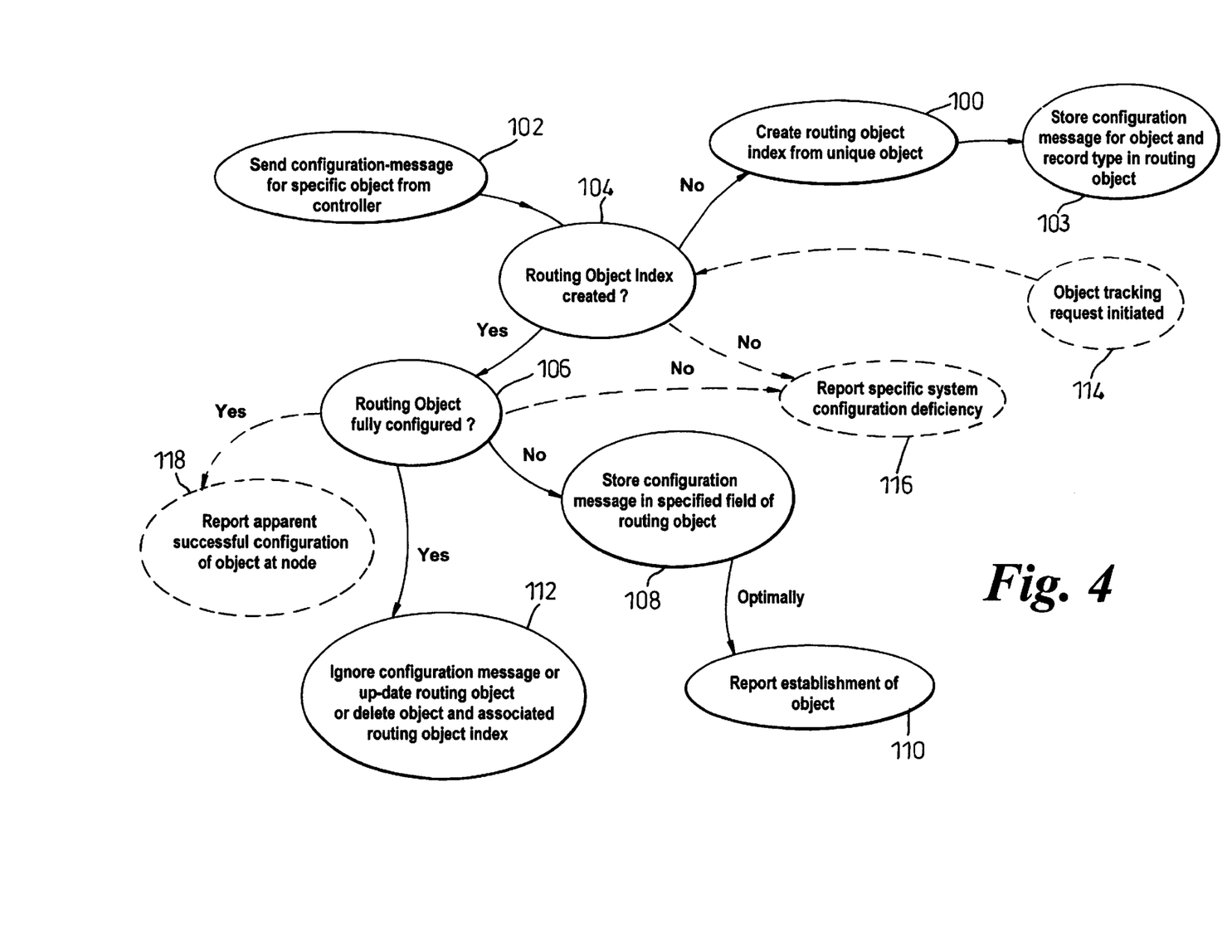
FIG. 4 is a state diagram detailing preferred object set-up mechanism underlying the present invention.

The preferred embodiment of the present invention operates in a different manner in the setting-up and accessing objects. Basically, as previously indicated, the intelligent trunking peripheral 16–18 requires certain configuration information to be sent to it by the controller 12, which information is generally sent in at least two separate data packages each of which contains an identifying marker that associates the configuration information. In contrast with the prior art techniques that assume that an object is always completed (i.e. that it exists and is completely operationally configured) following receipt of configuration information that partially establishes the object, the present invention (as shown in FIG. 4) establishes an intermediate object state 100 (termed a "routing object index") whenever it receives a first configuration message 102 or equivalent bit/byte of information (from the controller) identifying an object that needs to be established at the intelligent trunking peripheral. The initial configuration message clearly contains some pertinent information relating to its specified routing object and so it is necessary to store 103 this information since it is fundamental to valid routing object operation. The form of configuration message, i.e. the content of the configuration message, is also recorded 103 in relation to the corresponding routing object as opposed to the routing object index, although this merely requires a suitable management operation, such as the setting of an appropriate flag, within the routing object. Putting this another way, each routing object preferably records 103 which particular parts of the object have been received in the configuration messages sent 102 to the intelligent trunking peripheral by the controller.

The routing object index is given a name derived from the first configuration message 102, which name is consistently referenced in any subsequently received configuration messages necessary to fully configure the object. Preferably, the routing object index shares a common address or name with its corresponding object. For management simplicity, routing objects are generally collocated in a keyed collection of objects.

A routing object index is established for each object of each class, with the routing object index generally able to answer the questions: 1) Does a specific object of a certain class of objects exist 104?; and 2) Is the specific object of the certain class of objects configured 106? More particularly, since a routing object index is created 100 regardless of whether the object is effectively configured, the routing object index can always answer the question of whether the object exists. It is only necessary for a processor (62 of FIG. 1) in the intelligent trunking peripheral to conduct a search, based on the routing object index, through the dedicated memory location assigned to store routing object indices.

Once the routing object index of a specific object is established, any subsequent configuration message sent from the controller to the intelligent trunking peripheral concerning a specific object can be directed and, if necessary, stored 108 in the corresponding routing object. Consequently, if the intelligent trunking peripheral attempts to establish a connection then an assessment can be made as to whether the routing object is fully configured by merely checking that fields of the routing object are complete; this also acts to provide an integral form of configuration tracking for the network operator. Clearly, therefore, if the routing object is complete, then the object can actually be accessed (e.g. returned to the processor of the intelligent trunking peripheral) for use by the intelligent trunking peripheral in call connection. Should the routing object be incomplete, i.e. not configured, then the call establishment procedure can be efficiently and effectively terminated and the calling party can be notified that the called party is unavailable at that time. The dotted connections in the state diagram of FIG. 4 illustrate how a system operator can use the internal tracking function of the routing object index to assess overall system configuration. The network operator, for example, can initiate an object tracking request which requires the intelligent trunking peripheral to access the memory location for the routing objects and to report 116–118 accordingly.

Once a routing object has been validly configured, the intelligent trunking peripheral may, optionally, report 110 this to the controller.

In the following example, a route set called New York and an associated link set LS1 for the route set have been both established and configured through the sending and receipt of configuration messages respectively from the controller and by the intelligent trunking peripheral; this follows the previous procedure of FIG. 4. The intelligent trunking peripheral has also received a notification of link L1, but has yet to receive the requisite second configuration message. Consequently, the intelligent trunking peripheral has set up route object indices New York, link set LS1 and link L1. The intelligent trunking peripheral, in this state, is presently unable to complete a connection to a called party 50 in New York since no specific link is available.

Figure 5:
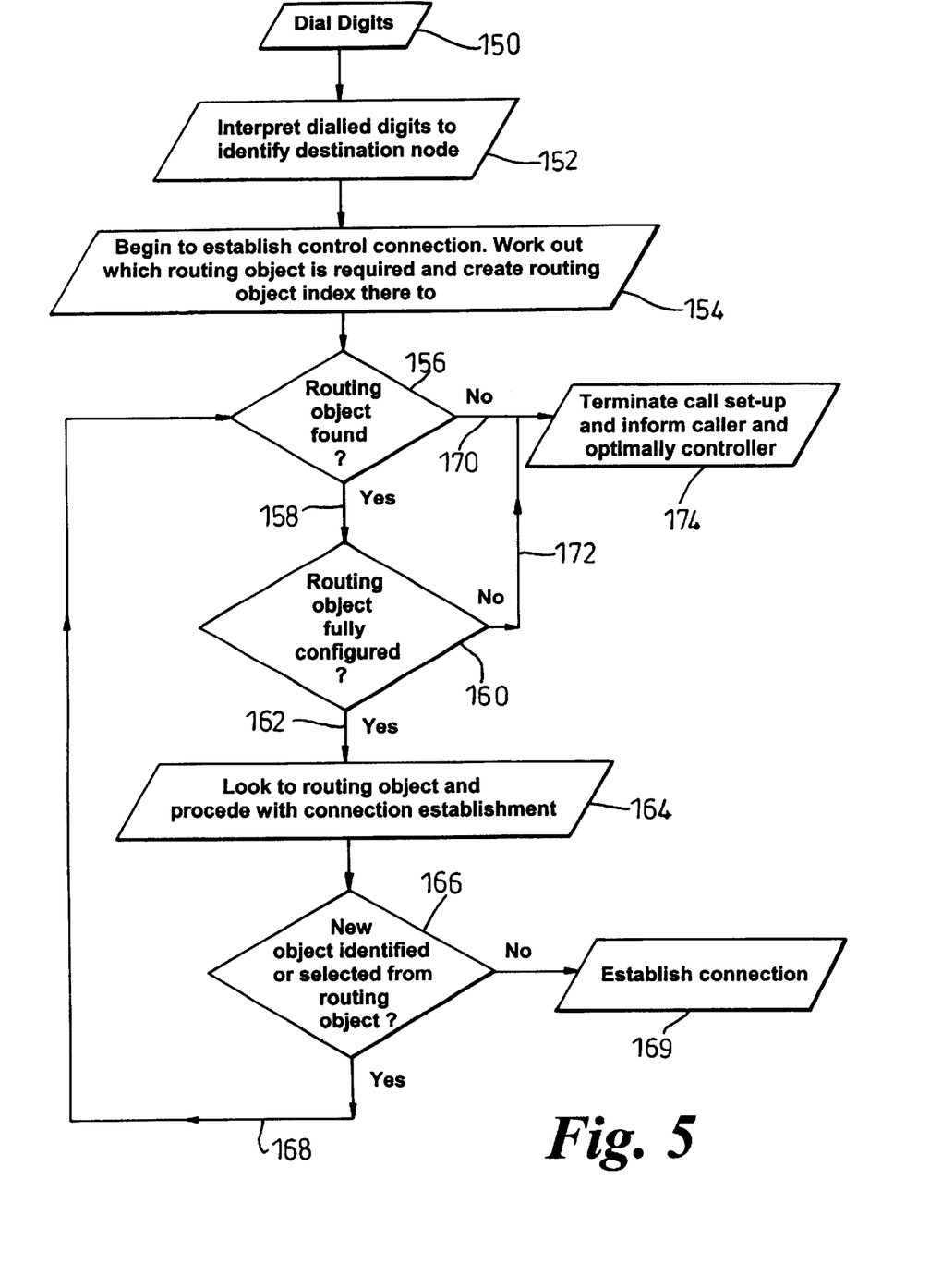
FIG. 5 is a flow diagram of a preferred connection mechanism underlying the present invention.

With reference to FIG. 5, when a calling party (40 of FIG. 2) attempts to place a call 150 to the called party (50 of FIG. 2) served by the New York node (34 of FIG. 2), an assigned intelligent trunking peripheral in the node (i.e. logical switch 10) identifies 152 the destination address as New York (from the dialled digits) and then creates 154–156 for the routing object index New York associated with the route set object New York. The intelligent trunking peripheral establishes that the routing object New York exists 158 and then causes the routing object index to ask 160 whether the route set object New York is configured by looking again to the corresponding routing object New York. Again the answer is in the affirmative 162 and so the intelligent trunking peripheral is able to access 164 the route set object New York for further information. It is preferable that, upon initial contact by the routing object index, the second question concerning object configuration should be immediately answered by the routing object New York.

In accordance with FIG. 3, the route set object identifies potential link sets and associated costs. The intelligent trunking peripheral now selects 166–168 a link set based on cost and must assess whether it has received the necessary information from the controller to interrogate and use the selected link set, namely LS1 in this example. The intelligent trunking peripheral looks to its memory (specifically to the routing object New York) to find the routing index to the object LS1 which, in this example, exists and is also configured. Consequently, the link set object LS1 can be interrogated to determine possible links to the destination New York. The intelligent trunking peripheral can then make a selection of the link to New York since the link information is contained in the link set, which in this instance is L1.

The intelligent trunking peripheral now searches its memory (specifically looking for the routing object index L1) and, since some information has been received from the controller in this respect, the intelligent trunking peripheral is able to locate the routing index to the object L1. However, upon interrogating the routing index to the object L1, the intelligent trunking peripheral identifies that it is deficient of configuration information (i.e. the routing object index indicates that link L1 is not properly configured) and so informs the calling party 40 that the call cannot presently be completed 174. The intelligent trunking peripheral can then solicit the missing information from the controller, if desired, through the sending of a data request.

In general, the procedure basically flows through a loop involving steps 156 to 168 until such time as the connection is established 169, or the connection cannot be completed 170–174 for lack of object configuration.

It is of course possible for a configuration message sent from the controller to require deletion of an object, with this easily accomplished by the processing capabilities of the node addressed by the controller. More specifically, configuration messages can effectively cause alteration or deletion 112 of the routing object index and associated object.

In summary, a routing object index is used as an intermediary between a routing object being referenced and either a referrer, another routing object or a routine. The routing object index is capable of answering questions asked of it by the referrer about the routing object. The referrer essentially creates a routing object index 100 using the unique name of the routing object, with creation always occurring whenever a routing object index has not previously been established for a particular routing object. The routing object index is therefore able to answer certain configuration questions, namely whether the routing object exists and whether the routing object configuration is complete. The routing object index uses its unique name (or address) to search for the routing object in its keyed location.

Once it is known that an instance (such as a specific object or routine) exists, then any question of operational capability can always be answered by the routing object itself, although the routing object index preferably functions to fend-off unnecessary access to the associated and potentially non-operationally configured object.

Use of the routing object index further improves robustness of the communications network since it is resistant to mis-configuration of the system and network topology and thus can prevent downtime at customer sites. Furthermore, the system of the preferred embodiment experiences a reduction in the number of lost messages, especially those that would otherwise arise during configuration changes.

Once an object has been configured, the routing object index associated with the mechanism of creation of that object can be discarded. Indexes are only created when needed. Whenever access to an object is required, a routing object index is again created and can then be discarded.

It will, of course, be appreciated that the above description has been given by way of example only and that modifications in detail may be made within the scope of the present invention. For example, while the preferred embodiment has been described in relation to a telephony system, the principles of providing a routing object index to interpret and assess the possibilities of end-to-end connection can be employed in other systems, such as within the Internet domain. Consequently, the term trunk merely implies a connection which may be a real circuit or a virtual connection to an addressing or addressed subscriber terminal, such as a modem of a computer or telephone. Indeed, the trunk may, in fact, be a radio channel in a cellular communication system environment.

We claim:

1. A method of configuring a communication system comprising a call server responsible for overseeing connection of a call and a node providing a connection interface to a calling party making the call and wherein the node is logically responsive to the call server and the connection is established through the use of at least one object, the method comprising:

receiving a first configuration message associated with an object, the first configuration message sent by the call server and containing information pertinent to the effective establishment of the object at the node;

establishing a routing object index associated with the object in response to the first configuration message and storing the information contained in the first configuration message as a partial object;

receiving at least a second configuration message associated with the object, said at least a second configuration message sent by the call server and containing additional information pertinent to the effective establishment of the object at the node;

recording receipt of said at least a second configuration message and storing the additional information contained in said at least a second configuration message with the partial object, thereby to complete the object; and providing access to the object at the node through a verification process involving the routing object index.

2. The method of configuring a communication system according to claim 1, wherein providing access to the object further includes:

establishing whether the routing object exists; and establishing whether the routing object is deemed fully configured.

3. The method of configuring a communication system according to claim 1, wherein the routing object has a plurality of configuration fields each being deemed complete upon respective receipt of said first configuration message and said at least a second configuration message.

4. The method of configuring a communication system according to claim 1, wherein the routing object index shares a common name with the object, the name derived from the first configuration message.

5. The method of configuring a communication system according to claim 1, including sending a further configuration message from the call server, the further configuration message containing information pertinent to the object and arranged to affect operation of the object.

6. The method of configuring a communication system according to claim 1, further including having the node report establishment of the object to the call server.

7. The method of configuring a communication system according to claim 1, wherein the object is one of:

a route set;

a link set; and a link.

8. The method of configuring a communication system according to claim 2, further comprising:

retrieving the object when the routing object is fully configured;

selecting, as necessary, a related object from the object; and searching for a second routing object index associated with the related object, which second routing object index is located within the object.

9. The method of configuring a communication system according to claim 8, further comprising:

establishing whether the second routing object exists; and establishing whether the second routing object is deemed fully configured.

10. The method of configuring a communication system according to claim 3, further comprising initiating a tracking request concerning configuration of the object, the tracking request further including commenting on the plurality of configuration fields of the routing object.

11. The method of configuring a communication system according to claim 1, further comprising establishing a connection only when the verification process indicates that the routing object exists and is deemed fully configured.

12. The method of configuring a communication system according to claim 11, wherein establishing a connection involves the calling party dialling digits and the node interpreting the dialled digits to identify an exchange serving a called party.

13. The method of configuring a communication system according to claim 1, wherein the node is a switch.

14. A method of establishing a communication link between a calling party and a called party addressed by the calling party in a communication system containing a plurality of routing nodes operationally responsive to a call server, the method comprising:

having the calling party enter an address of the called party into a first routing node, the address containing an indication of a destination routing node associated with the called party and wherein the destination routing node is accessed via a communication path determined by a plurality of objects;

providing access to selected ones of the plurality of objects at the node through a verification process involving a dedicated routing object index associated with each object.

15. The method of establishing a communication link according to claim 14, wherein providing access to the object further includes:

establishing whether the routing object exists using the routing object index; and establishing whether the routing object is deemed fully configured using the routing object index.

16. The method of establishing a communication link according to claim 15, wherein the routing object is established by a plurality of temporally displaced configuration messages communicated to selected nodes by the call server, wherein:

the routing object is created following receipt of a first configuration message associated with an object, the first configuration message containing information pertinent to the effective establishment of the object at the node;

a partial object is created from the first configuration message; and the routing object is deemed to be complete upon subsequent receipt at the node of at least a second configuration message associated with the object, said at least a second configuration message sent by the call server and containing additional information pertinent to the effective operational establishment of the object at the node, when combined with the first configuration message stored previously as the partial object.

17. The method of establishing a communication link according to claim 16, further including recording receipt of said configuration messages in the routing object and storing information contained in said configuration messages as the object.

18. The method of establishing a communication link according to claim 17, wherein the routing object has a plurality of configuration fields each being deemed complete upon respective receipt of said configuration messages.

19. A communication system comprising a call server responsible for overseeing connection of a call and a plurality of nodes providing a connection interfaces between a calling party and an addressed party, wherein the plurality of nodes are logically responsive to the call server and the connection is established through the use of at least one object within a node, each node comprising:

a memory having dedicated routing object indexes associated with objects, each routing object index created by the node in response to configuration messages sent by the call server and associated with a specific object, and a keyed index of objects accessible via specifically associated routing object indexes; and a processor arranged, in use, to administer receipt and storage of the configuration messages as objects and the creation of the dedicated routing object indexes, the processor further operationally responsive to an address of the addressed party whereby the processor is arranged to provide access to a selected object at the node only through a configuration verification process involving the routing object index.

20. An intelligent trunking peripheral for routing calls in a communication system, the intelligent trunking peripheral comprising:

a memory having dedicated routing object indexes each associated with objects, each routing object index created by the switch in response to configuration messages sent by the call server and associated with a specific object, and a keyed index of objects accessible via specifically associated routing object indexes; and a processor arranged, in use, to administer receipt and storage of the configuration messages as objects and the establishment of the dedicated routing object indexes, the processor further operationally responsive to an address whereby the processor is arranged to provide access, at the switch, to a selected object required to establish a communication path to the address only through a configuration verification process involving the routing object index.

21. A computer program product for a computerised intelligent trunking peripheral including a processor for selecting a communications path to an addressed party, the computer program product comprising:

code that directs the processor to create dedicated routing object indexes each associated with objects each configured at the computerised intelligent trunking peripheral by a plurality of configuration messagescode that directs the processor to store a keyed index of objects derived from information contained in the plurality of configuration messages;

code providing access to a selected one of the keyed index of objects via an operationally configured routing object index; and code rejecting the set-up of communications paths to an addressed party in the event that a routing object is deemed not to be fully configured by virtue of the processor not having received all necessary configuration messages required for configuration of an associated object.

22. The computer program product of claim 21, wherein the code resides in a computer readable memory.

23. A computer program product directly loadable into the internal memory of a computer, comprising software code portions for performing the steps of:

receiving a first configuration message associated with an object, the first configuration message sent by a call server and containing information pertinent to the effective establishment of the object at a routing node of a telecommunications network;

establishing a routing object index associated with the object in response to the first configuration message and storing the information contained in the first configuration message as a partial object;

receiving at least a second configuration message associated with the object, said at least a second configuration message sent by the call server and containing additional information pertinent to the effective establishment of the object at the node;

recording receipt of said at least a second configuration message and storing the additional information contained in said at least a second configuration message with the partial object, thereby to complete the object; and providing access to the object at the node through a verification process involving the routing object index;

wherein said product is run on a computer.

* * * * *